United States Patent [19]

Reutler et al.

[11] Patent Number: 4,707,327
[45] Date of Patent: Nov. 17, 1987

[54] CONTAINER SYSTEM FOR A HIGH-TEMPERATURE NUCLEAR REACTOR

[75] Inventors: Herbert Reutler, Cologne; Manfred Ullrich, Bergisch-Gladbach, both of Fed. Rep. of Germany

[73] Assignee: Interatom GmbH, Bergisch-Gladbach, Fed. Rep. of Germany

[21] Appl. No.: 681,544

[22] Filed: Dec. 14, 1984

[30] Foreign Application Priority Data

Dec. 15, 1983 [DE] Fed. Rep. of Germany ....... 3345457

[51] Int. Cl.⁴ ............................................. G21C 13/02
[52] U.S. Cl. ..................................... 376/294; 376/390
[58] Field of Search ................. 165/70; 376/204, 282, 376/283, 294, 295, 296, 298, 299, 381, 406, 390, 389

[56] References Cited

U.S. PATENT DOCUMENTS

| 3,098,025 | 7/1963 | Schluderberg | 165/70 |
| 3,115,450 | 12/1963 | Schanz | 376/283 |
| 3,414,473 | 12/1968 | Schluderberg et al. | 376/406 |
| 3,456,621 | 7/1969 | Bell et al. | 376/406 |
| 3,547,778 | 12/1970 | Flaherty et al. | 376/406 |
| 3,711,371 | 1/1973 | Cahill, Jr. | 376/294 |
| 3,981,770 | 9/1976 | Middleton | 376/282 |
| 4,097,332 | 6/1978 | Gibbons et al. | |
| 4,235,671 | 11/1980 | Barnert et al. | |
| 4,476,089 | 10/1984 | Müller-Frank et al. | |

FOREIGN PATENT DOCUMENTS

| 2818602 | 10/1979 | Fed. Rep. of Germany . |
| 3016402 | 11/1981 | Fed. Rep. of Germany . |
| 2373857 | 7/1978 | France . |
| 2385183 | 10/1978 | France . |
| 355533 | 8/1961 | Switzerland | 376/390 |

OTHER PUBLICATIONS

Nuclear Technology, vol. 62, No. 1, Jul. 1983, pp. 22-30.

Primary Examiner—Deborah L. Kyle
Assistant Examiner—Richard W. Wendtland
Attorney, Agent, or Firm—Herbert L. Lerner; Laurence A. Greenberg

[57] ABSTRACT

Container system for a high-temperature nuclear reactor, including an outer metallic pressure vessel having an inwardly-protruding flange, an inner metallic core barrel resting tightly on the flange, and means disposed below the flange at a lower end of the core barrel for feeding and discharging cooling fluid, the core barrel being gas-tight above the flange.

1 Claim, 1 Drawing Figure

U.S. Patent    Nov. 17, 1987    4,707,327
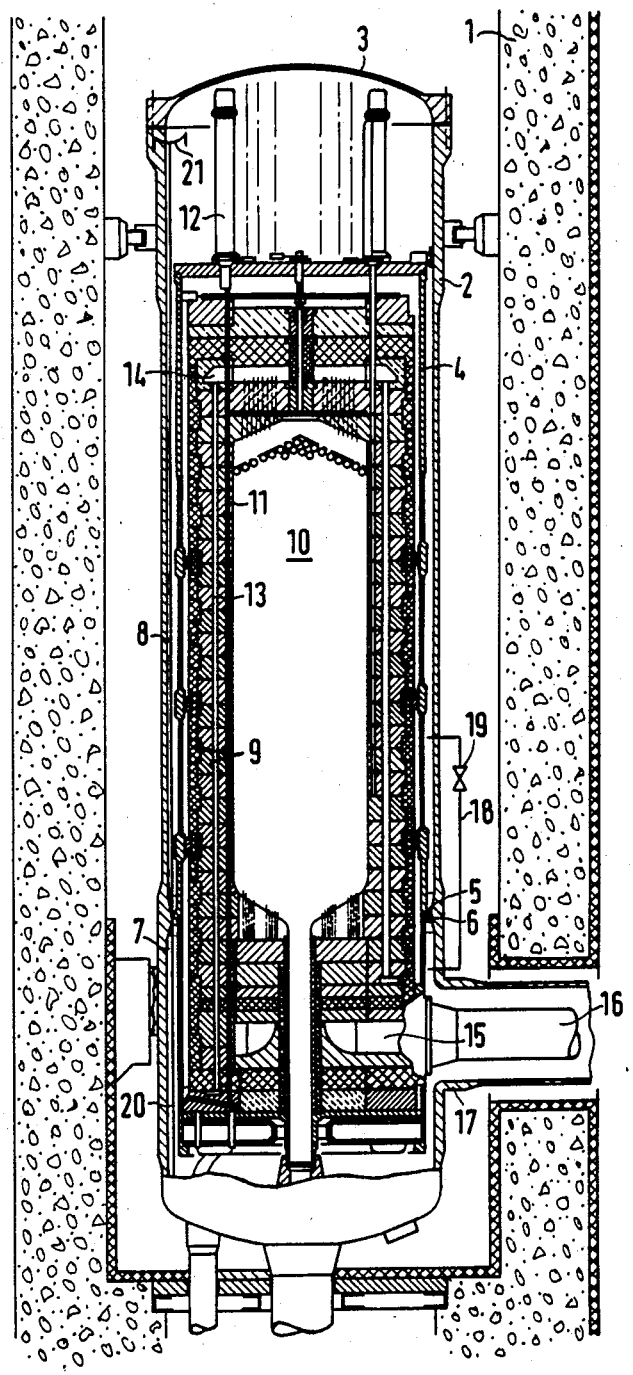

CONTAINER SYSTEM FOR A HIGH-TEMPERATURE NUCLEAR REACTOR

The invention relates to a container system for a high-temperature nuclear reactor, including an outer metallic pressure vessel, and an inner metallic core barrel, feeding and discharge of cooling fluid taking place at the lower end of the core barrel.

A reactor of this type has been described in German Published, Non-Prosecuted Application DE-AS No. 30 16 402, corresponding to U. S. Pat. No. 4,476,089. Among other things, that patent proposes the placement of a core barrel containing the nuclear reactor proper in a steel pressure vessel such as has been used heretofore in the construction of water-cooled reactors. It was assumed in that disclosure that the spaces between the pressure vessel and its internal parts would be in communication with each other everywhere and would be filled with the helium used as the cooling fluid. Furthermore, no statements were made in the above-mentioned publication regarding the manner in which the core barrel should be fastened in the pressure vessel. Additionally, there were no provisions for preventing contamination of spaces between the pressure vessel and core barrel during servicing.

It is accordingly an object of the invention to provide a container system for a high-temperature nuclear reactor, which overcomes the hereinafore-mentioned disadvantages of the heretofore-known devices of this general type, and in which the part of the space between the core barrel and the pressure vessel, in which devices are disposed which need frequent testing or servicing (for instance, the absorber rod drives normally placed in the ceiling of the core barrel, or the feed device such as for spherical fuel elements) can be made accessible without the danger of a break-in of the ambient atmosphere (i.e., of oxygen-containing air) into the interior of the core barrel, which would lead to considerable corrosion of the internal parts thereof, formed of carbon blocks and/or graphite, or of the fuel elements.

With the foregoing and other objections in view there is provided, in accordance with the invention, a container system for a high-temperature nuclear reactor, comprising an outer metallic pressure vessel having an inwardly-protruding flange, an inner metallic core barrel resting tightly on the flange, and means disposed below the flange at a lower end of the core barrel for feeding and discharging cooling fluid, the core barrel being gas-tight above the flange. A pad which is already required for holding the core barrel in the pressure vessel is constructed in such a way that it simultaneously serves as a partition between the upper part of the above-mentioned space and the lower part thereof. Only the feed and discharge devices for the cooling fluid are located in the space. If the weight of the core barrel is known, one of ordinary skill in the art can construct the required size of the sealing surface without difficulty so that with a suitable construction of the sealing surface, the required sealing effect is achieved due to the weight of the core barrel itself. (Due to the high operating temperatures, elastomer seals are out of the question, and preferably, metal O-rings are used). Since the core barrel should be removable for repair purposes, a form-locking connection of the core barrel and the mounting flange is dispensed with. A form-locking connection is one in which parts are locked together by virtue of their own shape. The weight of the core barrel is also sufficient to reliably prevent the core barrel from being lifted off if a slightly higher pressure prevails in the lower part of the space than in the upper part. (Such a pressure difference is 2 bar for an operating pressure of the reactor of, for instance, 40 bar). The upper space is advantageously also filled with helium which, however, is not contaminated because it does not circulate through the nuclear reactor and other parts of the plant (such as heat exchanger); therefore, no radioactive deposits can occur in the upper space, which would limit the desired accessibility of the core barrel. Since no piping carrying the cooling medium is present in the upper space, the core barrel can be made tight at that location, and the feedthroughs required for the absorber rod drives etc. can be made gas-tight by conventional means (such as sliding valves).

In order to prevent possible contamination of the gas filling the upper space by microscopic leaks at the sealing surface between the core barrel and the pressure vessel, the upper space is advantageously kept at a slight overpressure.

In accordance with another feature of the invention, the core barrel is disposed at a distance from the pressure vessel defining a space therebetween, the flange dividing the space into upper and lower spaces, and including an equalization line connected between the upper and lower spaces, and means for shutting off the line. In this way, larger pressure differences between the upper and the lower space are controlled. By limiting the pressure difference, the passage of larger leakage amounts in one direction or the other is prevented. This device is sufficient to equalize the pressure differences expected during normal operation.

In accordance with a concomitant feature of the invention, there is provided another equalization line leading from the lower end to the upper end of the core barrel interconnecting the upper and lower spaces, and a rupture disc protector closing off the other line. These features are provided to take care of a sudden occurrence of a major leak in the pressure vessel. Rupture disc protectors are well or known components which are completely tight in normal operation but completely release a pipe line which is provided for this purpose and is constructed for obtaining a sufficiently fast pressure equalization if a given response pressure is exceeded. However, a line connecting the lower space to the upper space over the shortest path would favor the occurrence of natural convection, wherein the air penetrating into the upper space through the leak could also reach into the interior of the core barrel, which is to be avoided, as explained above. The second equalization line provides a direct path to the lower end of the lower space for the cold air which has penetrated through the leak into the upper space after the rupture disc has opened, and thus, the lower space is therefore also flooded. The temperature difference present in the gas which circulates in the core barrel by natural circulation after the cooling blowers have failed or have been shut down and which removes the decay heat, causes a stratification which prevents the penetration of the corroding air therein.

Other features which are considered as characteristic for the invention are set forth in the appended claims.

Although the invention is illustrated and described herein as embodied in container system for a high-temperature nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing in which the single feature is a diagrammatic and schematic axial longitudinal-sectional view of a gas-cooled high-temperature reactor.

Referring now to the figure of the drawing in detail, there is seen a concrete structure 1 serving as a radiation shield, and a steel pressure vessel 2 in the concrete structure which is provided with a detachable cover 3 at its upper end. A core barrel 4 which is also metallic is disposed within the pressure vessel 2. The metallic core barrel 4 has a support or mounting in the form of a circular projection 5 which rests on a similarly circular flange 6 formed at the inside of the pressure vessel 2. The circular projection and flange divide the space between the core barrel 4 and the pressure vessel 2 into an upper space 8 and a lower space 7. The contact surfaces between the circular projection and flange are constructed with respect to their size and type of surface in such a manner as to form a gas-tight seal which is effective even for small pressure differences, between the lower space 7 and the upper space 8 between the pressure vessel and the core barrel. The core barrel 4 contains ceramic internal parts 9 formed of carbon blocks and/or graphite which surround a space for accommodating a fission zone 10 formed of a multiplicity of spherical fuel elements. Among other things, canals 11 are extended through the internal parts 9. Absorber rods can be moved through the canals 11 for controlling the fission zone, by means of conventional drives 12 disposed on the ceiling of the core barrel 4. The internal parts 9 also contain canals 13, through which cooling gas enters the space 7 from a non-illustrated heat sink through a hot-gas line 16. The cooling gas is conducted to an upper plenum 14, thereby cooling the internal parts 9, and is sent from the plenum 14 through the fission zone from top to bottom. The hot cooling gas flows together into a lower plenum 15 and is conducted to the heat sink through the hot-gas line 16 coaxially disposed in a nozzle 17 of the pressure vessel 2. The upper space 8 is likewise filled with helium which is preferably used as the cooling gas. However, the cooling gas in the space 8 is stagnant and can therefore be kept at a slight overpressure relative to the lower space, so as to prevent contamination of the gas by impurities which are unavoidably present in the cooling gas proper and can be further activated while passing through the fission zone. Since the core barrel 4 is gas-tight above the support 5, 6, the nuclear reactor cover 3 can be removed for repair and servicing purposes (such as to provide service on the absorber rod drives 12), without impairing the accessibility of the parts which will then be exposed due to radioactive contamination and without the danger of the air which than fills the upper space 8 from reaching the internal parts 9 and corroding them. The lower space 7 and the upper space 8 are in connection with each other through a first schematically-illustrated equalization line 18 which can be shut off by a valve 19. The line 18 provides the mutual matching of the respective pressures corresponding to the different operating conditions, required in normal reactor operation. However, the line 18 is not sufficient for equalizing the pressure differences suddenly occurring in the event of a major leak in the pressure vessel 2. For this purpose, a second equalization line 20 is provided. The line 20 begins near the lower end of the core barrel 4 and is brought through the gap between the core barrel 4 and the internal parts 9 to the upper end of the core barrel 4 where it is provided with a schematically-illustrated rupture disc protector 21. If required, the protector 21 quickly releases a flow cross section sufficient for pressure equalization and thus prevents a possible lifting of the core barrel 4 from its mounting 5, 6. The decay heat still developing even if the reactor is then shut down, sets the cooling gas contained in the interior of the core barrel 4 in a convective flow, which carries out the decay heat removal from the fission zone 10. The second equalization line 20 which is then open, carries the cold and therefore heavier air which has penetrated into the upper space 8, into the lower space 7, filling it. However, the air cannot enter into the interior of the core barrel 4 because this is prevented by the temperature stratification between the air and the hot gas.

The foregoing is a description corresponding, in substance, to German Application No. P 33 45 457.4, dated Dec. 15, 1983, International priority of which is being claimed for the instant application, and which is hereby made part of this application. Any material discrepancies between the foregoing specification and the specification of the aforementioned corresponding German application are to be resolved in favor of the latter.

There are claimed:

1. Container system for a high-temperature nuclear reactor, comprising an outer metallic pressure vessel having an inwardly-protruding flange, an inner metallic core barrel resting tightly on said flange, said core barrel being disposed at a distance from said pressure vessel defining a space therebetween, said flange dividing said space into upper and lower spaces, an equalization line connected between said upper and lower spaces, means for shutting off said line, another equalization line leading from the lower end to the upper end of said core barrel interconnecting said upper and lower spaces, a rupture disc protector closing off said other line, and means disposed below said flange at a lower end of said core barrel for feeding and discharging cooling fluid, said core barrel being gas-tight above said flange.

* * * * *